(12) United States Patent
Jordan et al.

(10) Patent No.: US 11,005,239 B2
(45) Date of Patent: May 11, 2021

(54) MAGNETIC ARC VENT SEAL

(71) Applicant: Schneider Electric USA, Inc., Andover, MA (US)

(72) Inventors: Jeffrey T. Jordan, Franklin, TN (US); Gregory O. Motley, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 237 days.

(21) Appl. No.: 16/434,538

(22) Filed: Jun. 7, 2019

(65) Prior Publication Data

US 2019/0288490 A1    Sep. 19, 2019

Related U.S. Application Data

(62) Division of application No. 14/658,221, filed on Mar. 15, 2015, now Pat. No. 10,361,541.

(51) Int. Cl.
*H02B 1/56* (2006.01)
*H02B 1/38* (2006.01)
*H02B 1/28* (2006.01)

(52) U.S. Cl.
CPC ............. *H02B 1/565* (2013.01); *H02B 1/28* (2013.01); *H02B 1/38* (2013.01)

(58) Field of Classification Search
CPC ........ H02B 13/025; H02B 1/565; H02B 1/28; H02B 1/38
USPC .................................. 454/184, 238; 361/601
See application file for complete search history.

(56) References Cited

U.S. PATENT DOCUMENTS

| | | | |
|---|---|---|---|
| 2,609,221 A | 9/1952 | Schultz | |
| 4,180,177 A | 12/1979 | Gunderman et al. | |
| 5,767,440 A | 6/1998 | Byron et al. | |
| 5,905,244 A | 5/1999 | Smith et al. | |
| 6,535,382 B2 | 3/2003 | Bishop et al. | |
| 7,140,702 B2 | 11/2006 | Byron et al. | |
| 7,952,857 B1 * | 5/2011 | Motley | H02B 1/56 361/678 |
| 8,456,838 B2 | 6/2013 | Ballard et al. | |
| 8,842,421 B2 | 9/2014 | Gingrich | |
| 10,361,541 B2 | 7/2019 | Jordan et al. | |

* cited by examiner

*Primary Examiner* — Kenneth J Hansen
*Assistant Examiner* — Dana K Tighe
(74) *Attorney, Agent, or Firm* — Locke Lord LLP (57) ABSTRACT

Method and apparatus for sealing an air vent in a switchgear cabinet provide a vent seal assembly having a vent seal cover and a set of linear guides on which the vent seal cover may be mounted. The vent seal cover and linear guides are housed within a casing attachable to an interior surface of the switchgear cabinet and directly over an air vent. Within the casing, the vent seal cover may slide freely along the linear guides toward the air vent, with no spring or other mechanical biasing mechanism to oppose the sliding of the cover. A catch on the casing releasably holds the vent seal cover to keep the air vent open during normal operating conditions. When an arc event occurs, pressure from the arc event knocks the vent seal cover free of the catch and propels it toward the air vent, quickly slamming the air vent shut.

7 Claims, 6 Drawing Sheets

MAGNETIC ARC VENT SEAL

CROSS-REFERENCE TO RELATED APPLICATIONS

This application for patent is a divisional of U.S. application Ser. No. 14/658,221, entitled "Magnetic Arc Vent Seal," filed Mar. 15, 2015, the entire disclosure of which is incorporated herein by reference thereto.

FIELD OF THE INVENTION

The disclosed embodiments relate generally to switchgear and similar electrical isolation equipment, and particularly to methods and apparatuses for quickly sealing the cabinets of such isolation equipment.

BACKGROUND OF THE INVENTION

Switchgear and similar electrical isolation equipment are highly regulated by industry standards (e.g., IEEE, ANSI, etc.). Among other things, these standards specify how much temperature may rise within a switchgear cabinet and the maximum allowable temperature. To comply with the temperature limitations, ventilation is used in certain switchgear to improve ambient air flow through the switchgear cabinet. For example, in smaller switchgear like the HVL/cb™ series of metal-enclosed switchgear from Schneider Electric USA, Inc., air vents may be provided on the front door of the cabinet near the bottom thereof and on the back cover of the cabinet near the top thereof to create cross flow ventilation through the cabinet.

The air vents, however, can cause the switchgear not to pass certain industry safety standards. For example, in order for switchgear to be considered arc resistant under industry standards, the switchgear cabinet must not allow arc blast to escape during an arc event, as the hot arc blast can cause significant damage to nearby equipment and personnel. Some air vents therefore include a vent cover that remains open under normal operating conditions, but immediately closes upon occurrence of an arc event to seal the switchgear cabinet and thereby contain the arc event within the cabinet.

To keep the vent cover open, existing air vents employ a spring or similar mechanical biasing mechanism that continuously pushes or otherwise maintains the vent cover in an open position. When an arc event occurs, the resulting pressure surge forces the vent cover into a closed position, compressing the spring or other mechanical biasing mechanism in the process. As the spring or biasing mechanism compresses, it pushes with progressively greater force against the vent cover in a direction opposite the compression. The increase in resistance from the spring or biasing mechanism can cause the vent cover not to close immediately and/or completely during an arc event, potentially allowing arc blast to escape from the cabinet and creating a safety hazard for nearby equipment and personnel.

Thus, a need exists for a more effective way to close air vents in the cabinets of switchgear and similar electrical isolation equipment.

SUMMARY OF THE DISCLOSED EMBODIMENTS

The embodiments disclosed herein are directed to a method and apparatus for sealing air vents in switchgear and similar electrical isolation equipment. The method and apparatus provide a vent seal assembly having a vent seal cover and a set of linear guides on which the vent seal cover may hang or otherwise be mounted. The vent seal cover and the linear guides are housed within framing, which may be a generally rectangular open-sided casing, that is attachable to an interior surface of a switchgear cabinet directly over an air vent in the cabinet. Within the casing, the vent seal cover may slide freely along the linear guides toward and away from the air vent, with no spring or other mechanical biasing mechanism to resist the sliding of the cover in either direction. A catch mechanism on the casing releasably holds the vent seal cover against the casing away from the air vent to keep the air vent open during normal operating conditions. When an arc event occurs, blast pressure from the arc event knocks the vent seal cover free of the catch mechanism and propels it toward the air vent, quickly slamming the vent seal cover shut against the air vent and cutting off further air flow through the air vent.

In some embodiments, the generally rectangular casing may be constructed of two generally flat opposing frame members, a front or vent-side frame member and a rear or cabinet-side frame member. The two frame members are similar or the same in size, with each frame member resembling a typical picture frame or window frame insofar as each frame member defines a generally rectangular window or opening that is similar or the same as the window or opening in the opposing frame member. Support braces extending perpendicularly from one of the frame members, for example, the rear frame member near the corners thereof keep the two frame members separated from one another by a predefined distance to form the casing.

Within the casing, the linear guides, which may be simple roll pins in some embodiments, extend between the two frame members substantially perpendicularly thereto near the corners thereof. The roll pins suspend or otherwise support the vent seal cover, which may be a generally rectangular sheet of fiberglass, within the casing substantially parallel to the frame members and hence substantially parallel to the air vent. This arrangement allows the vent seal cover to slide freely back and forth along the linear guides toward and away from the air vent, meaning it does not require a greater or lesser amount of force to move the vent seal cover in one direction compared to the other under normal operating conditions.

In some embodiments, the catch mechanism that releasably holds the vent seal cover to keep the air vent open during normal operation may be mounted on the rear frame member of the casing. Any suitable catch mechanism capable of a quick release may be used to keep the air vent open, such as a magnet-based catch analogous to the type widely used to keep doors closed in room furniture, kitchen cupboards, and the like. Although a single magnet-based catch may suffice, preferably two such magnet-based catches are attached to the rear frame member of the casing, one on the upper portion and one on the lower portion of the frame member. Ferrous metal plates may then be attached to the vent seal cover at locations corresponding to the locations of the magnet-based catches for magnetically engaging the catches. Alternatively, the magnet-based catches may be mounted on the vent seal cover and the metal plates may be mounted on the rear frame member.

In general operation, the front frame member of the casing is mounted on an interior surface of the switchgear cabinet directly over an air vent, for example, the air vent on the lower portion of the front door and/or the upper portion of the back cover of the cabinet. During normal operating conditions, the vent seal cover is held against the rear frame member by the magnet-based catches, allowing air to flow through the window or opening in the front frame member and hence through the air vent. When an arc event occurs in the switchgear cabinet, the pressure from the arc event explodes through the window or opening in the rear frame member, knocking the vent seal cover free of the magnet-based catches and propelling it toward the front frame member. As there is no further resistance at this point other than surface friction from the roll pins, the vent seal cover immediately slams into the front frame member, quickly cutting off further air flow through the front frame member and hence through the air vent.

In some embodiments, a generally rectangular gasket or similar liner may be disposed around the window or opening of the front frame member on the side facing the vent seal cover to provide an airtight seal between the front frame member and the vent seal cover.

In general, in one aspect, the disclosed embodiments relate to a vent seal assembly. The vent seal assembly comprises, among other things, a generally rectangular casing composed of a generally flat front frame member spaced apart by a predefined distance from a generally flat rear frame member, each frame member defining a generally rectangular window therein. The vent seal assembly also comprises linear guides extending between the front frame member and the rear frame member substantially perpendicular thereto, each linear guide positioned near a corner of the front frame member and the rear frame member. The vent seal assembly further comprises a generally rectangular vent seal cover slidably mounted on the linear guides between the front frame member and the rear frame member substantially parallel thereto. A catch mechanism may be mounted on the rear frame member and configured to releasably hold the vent seal cover against the rear frame member to allow air flow through the window in the front frame member.

In general, in another aspect, the disclosed embodiments relate to an arc resistant switchgear cabinet. The arc resistant switchgear cabinet comprises, among other things, an air vent located at an exterior surface of the switchgear cabinet, and a vent seal assembly mounted on an interior surface of the switchgear cabinet directly over the air vent. The vent seal assembly includes a vent seal cover slidably disposed therein, the vent seal cover being held away from the air vent under normal operating conditions and sliding freely toward the air vent to block air flow through the air vent upon occurrence of an arc event.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
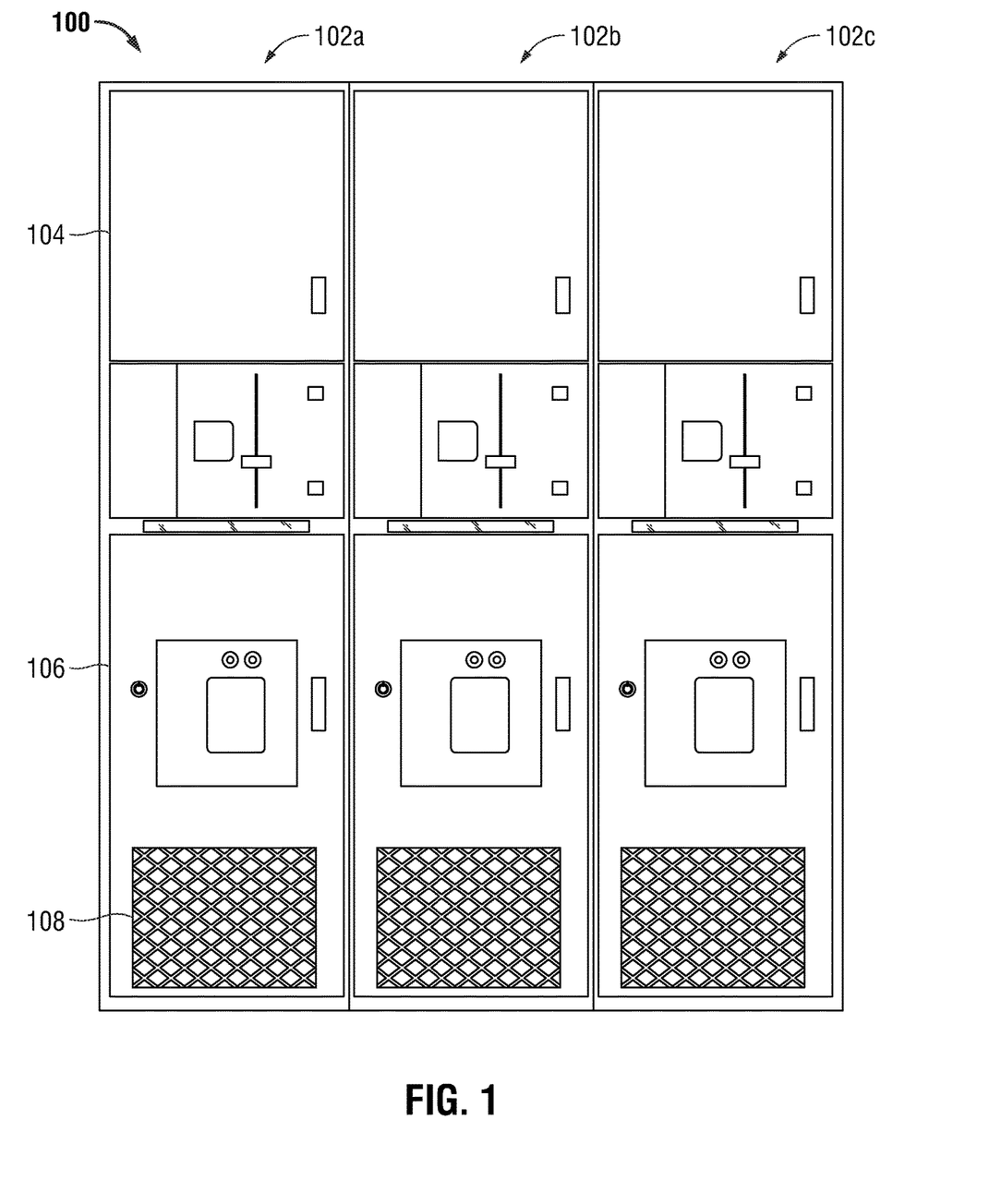
FIG. 1 is a front view of several switchgear cabinets having a vent seal assembly therein according to some implementations of the disclosed embodiments.

Referring now to FIG. 1, an exemplary switchgear system 100 is shown according to the disclosed embodiments composed of several modular switchgear cabinets 102a, 102b, and 102c. The particular switchgear system 100 shown here is a medium voltage switchgear, that is, a system with voltage ratings generally between 1 kV-35 kV. An example of such a medium voltage switchgear is the HVL/cb™ series of metal-clad switchgear from Schneider Electric USA, Inc., referenced above. It should of course be understood that the principles and concepts discussed herein are also applicable to switchgear having lower and higher voltage ratings.

Each switchgear cabinet 102a-c has a top front door 104, a bottom front door 106, and a control panel (not expressly labeled) between the top and bottom front doors 104 and 106. An air vent 108 may be disposed on or in a lower portion of the bottom front door 106 in one or more of the cabinets 102a-c for ventilation purposes in any necessary manner. As well, in some embodiments, an air vent 108 may also be disposed, for example, on a back cover (not expressly shown) of one or more of the cabinets 102a-c on the upper portion thereof to create cross flow ventilation through the cabinet 102a-c. As explained with respect to FIGS. 2A-2C, In accordance with the illustrated embodiment, a vent seal assembly 200 may be installed directly behind each air vent 108 to immediately close off air flow through the air vent 108 upon occurrence of an arc event. The vent seal assembly 200 may be mounted on an interior surface of the switchgear cabinet 102a-c, for example, on the bottom front door 106, or on some other interior surface of the cabinets 102a-c. In any case, the ability of the vent seal assembly 200 immediately to close off air flow through the air vent 108 upon occurrence of an arc event helps the switchgear cabinet 102a-c to be considered as arc resistant.

Figure 2A:
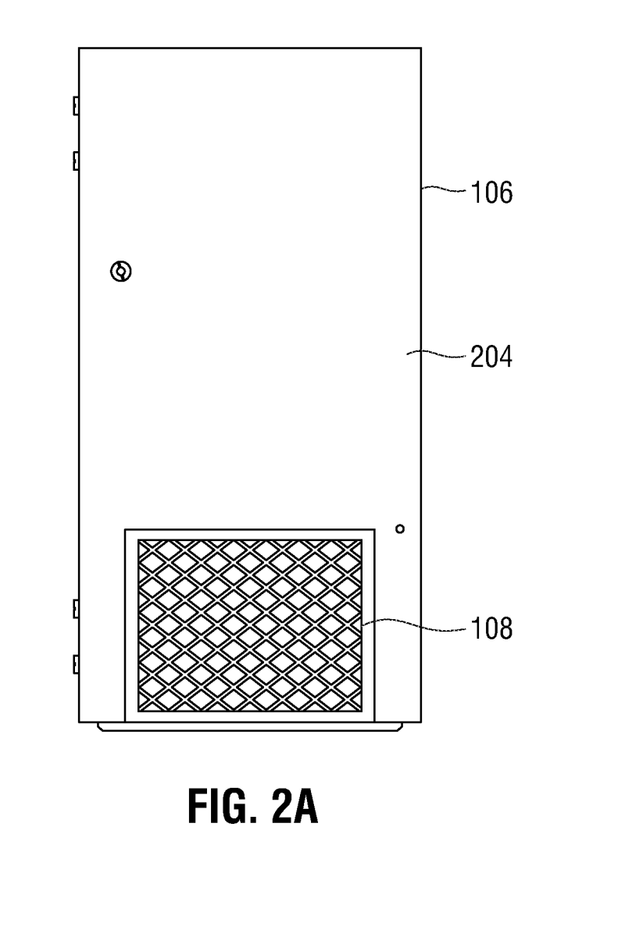
FIGS. 2A, 2B, and 2C are front, side, and rear views, respectively, of a cabinet door on which a vent seal assembly may be mounted according to some implementations of the disclosed embodiments.
Figure 2B:
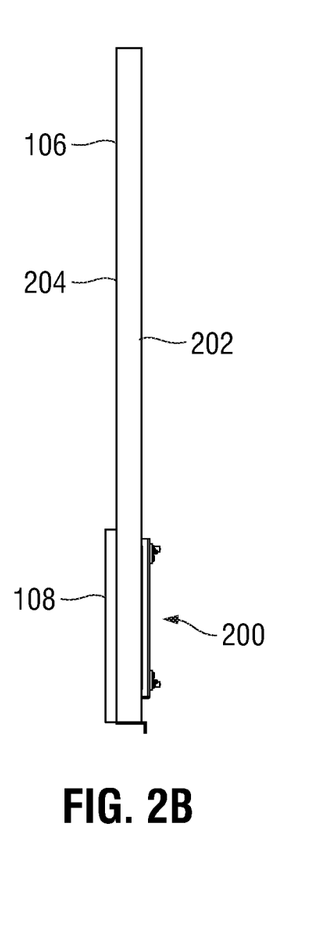
Figure 2C:
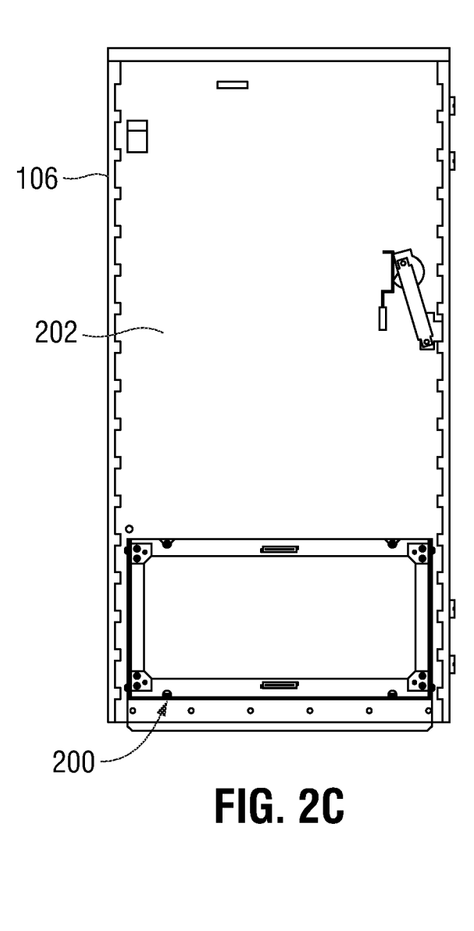

Turning to FIGS. 2A-2C, the exemplary vent seal assembly 200 is shown mounted to the inside surface 202 of the bottom front door 106 of one of the switchgear cabinets 102a-c. The vent seal assembly 200 is positioned directly opposite the air vent 108, which is mounted on the outside surface 204 of the bottom front door 106, as best seen in FIG. 2B. A similar arrangement may be deployed for air vents 108 mounted elsewhere on the cabinet 102a-c. But wherever it is mounted, the vent seal assembly 200 is flush against the surface of the cabinet 102a-c so any air flow passing in or out of the air vent 108 must also pass through the vent seal assembly 200.

Figure 3:
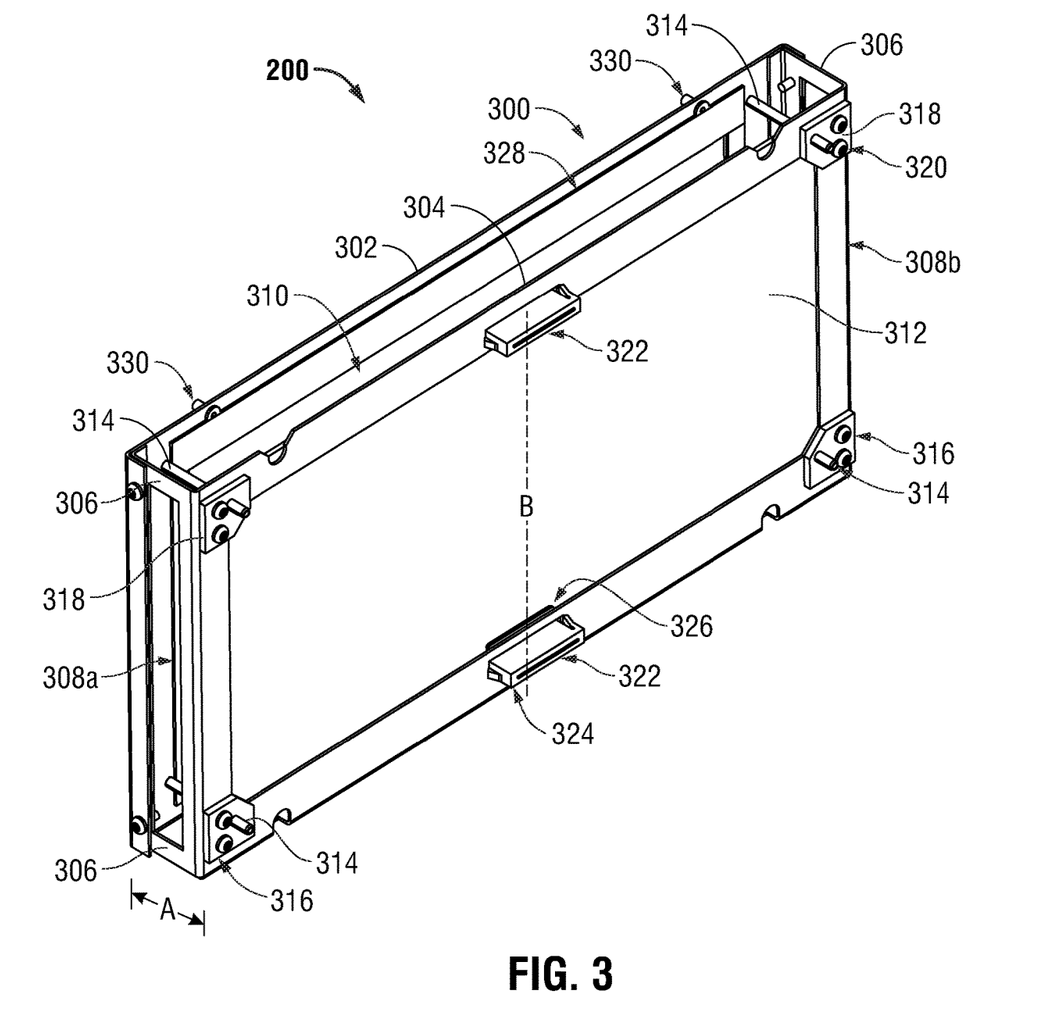
FIG. 3 is a perspective view of an exemplary vent seal assembly according to some implementations of the disclosed embodiments.

FIG. 3 illustrates an exemplary implementation of the vent seal assembly 200 according to the disclosed embodiments. In this example, the vent seal assembly 200 includes a generally rectangular open-sided (i.e., having at least one side opening) casing 300 constructed of two generally flat opposing frame members: a front or vent-side frame member 302 and a rear or cabinet-side frame member 304. It will be appreciated that the casing 300 might be other than a rectangular shape, such as other polygonal shapes or circular. The two frame members 302 and 304 may be roughly the same size, with each frame member resembling a typical picture frame or window frame. Specifically, each frame member 302 or 304 defines a generally rectangular window or opening 302a and 304a (see FIGS. 4 and 6), respectively, that is similar or the same as the window or opening in the opposing frame member 302 or 304. Support braces 306 extending perpendicularly from one of the frame members, for example, the rear frame member 304 near the corners thereof, keep the two frame members 302 and 304 separated from one another by a predefined distance "A," which may be approximately 2.06 inches in some embodiments, such as for the above-mentioned HVL/cb™ metal-enclosed switchgear or similar metal-enclosed and metal-clad switchgear, to form the casing 300. The casing 300 may also have side slots 308a and 308b provided on the sides of the casing 300 and a top slot 310 along the top of the casing 300 in some embodiments that facilitate air flow through the casing 300 under normal operating conditions.

A generally rectangular vent seal cover 312 is disposed within the casing 300 between the front and rear frame members 302 and 304 substantially parallel to the frame members (and hence substantially parallel to the air vent 108). The vent seal cover 312, which may be a thin sheet of fiberglass material (e.g., GPO-3 fiberglass), may hang or be otherwise suspended on linear guides 314 extending between the two frame members 302 and 304, perpendicular thereto and at or near the corners thereof. The linear guides 314 may be simple roll pins 314 in the example shown here, but any suitable linear guide that allows the vent seal cover 312 to slide freely within the casing 300 toward or away from the frame members 302 and 304 may be used without departing from the scope of the disclosed embodiments. Mounting plates 318 may be disposed on one of the frame members, for example, the rear frame member 304 near each corner thereof to secure the roll pins 314 within the casing 300. The mounting plates 318 may receive one or more screws 320 therein to fasten the plates 318 to the rear frame member 304 and thereby secure the roll pins 314.

A catch mechanism 322 may be mounted on the rear frame member 304 in some embodiments to keep the air vent 108 open during normal operating conditions. Specifically, the catch mechanism 322 releasably holds the vent seal cover 312 against the rear frame member 304 (and hence away from the air vent 108) to keep the air vent 108 open. In some embodiments, the catch mechanism 322 may be a magnet-based catch 324 of the type normally used to keep doors closed in room furniture, kitchen cupboards, and the like. A single magnet-based catch 324 may be adequate in most embodiments, but preferably two such magnet-based catches 324 are attached to the rear frame member 304, one on the upper portion near the middle thereof and one on the lower portion near the middle thereof. Ferrous metal plates 326 may then be attached to the vent seal cover 312 at locations corresponding to the locations of the magnet-based catches 324 for magnetically engaging the catches.

The use of magnet-based catches 324 in the foregoing embodiments avoids the need for springs or other mechanical biasing mechanisms in the vent seal assembly 200 that could oppose the sliding of the vent seal cover 312 along the linear guides 314 or be less reliable to release. This means the vent seal cover 312 can slide just as easily in one direction as in the other direction under normal operating conditions. Additionally, having two magnet-based catches 324 and mounting them in the middle of the upper portion and lower portion of the rear frame member 304 allows the vent seal cover 312 to swivel slightly around an axis "B" extending through the magnet-based catches 324. The swivel creates a torque about the axis "B" that helps the vent seal cover 312 more easily to break free of the magnet-based catches 324 than it otherwise could. It is also possible to achieve a similar result with the magnet-based catches 324 mounted instead on the sides of the rear frame member 304 near the middles thereof. Alternatively, the magnet-based catches 324 may be mounted on vent seal cover 312 and the metal plates 326 mounted on the rear frame member 304 in some embodiments. Other catch mechanisms 322 of comparable speed and reliability to the magnet-based catches 324 may also be used to keep the air vent 108 open without departing from the scope of the disclosed embodiments.

In general operation, the casing 300 of the vent seal assembly 200 is mounted on an interior surface of a switchgear cabinet 102a-c directly over an air vent 108, for example, the air vent on the bottom front door 106 (see FIGS. 2A-2C) and/or the back cover of the cabinet 102a-c. The casing 300 may be so mounted via screws 330 on the front frame member 302 near the corners thereof that fasten the front frame member 302 to the switchgear cabinet 102a-c. Once the vent seal assembly 200 is mounted, the vent seal cover 312 is slid back to the rear frame member 304 where the magnet-based catches 324 hold the cover in place, allowing air to flow through the front frame member 302 and hence through the air vent. When an arc event occurs in the switchgear cabinet 102a-c, the blast from the arc event knocks the vent seal cover 312 free of the magnet-based catches 324 and propels it toward the front frame member 302. As there is no force opposing the vent seal cover 312 at this time besides the surface friction from the roll pins 314, the vent seal cover 312 immediately slams into the front frame member 302, quickly cutting off further air flow through the front frame member 302 and hence through the air vent 108. In some embodiments, a generally rectangular gasket or similar liner 328 may be disposed on the front frame member 302 on the side facing the vent seal cover 312 to provide an airtight seal between the front frame member 302 and the vent seal cover 312.

Figure 4:
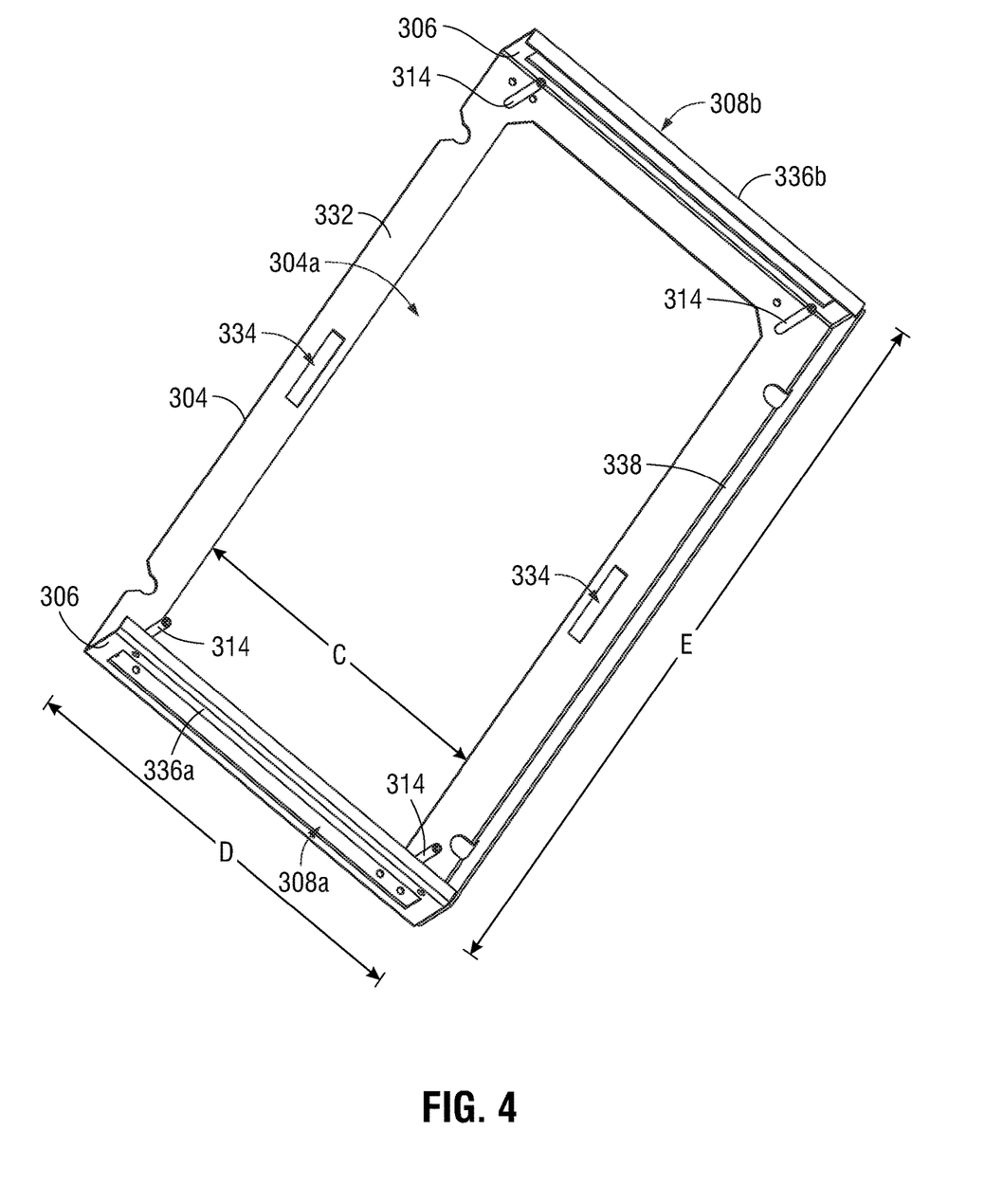
FIG. 4 is a perspective view of a rear frame member of a vent seal assembly according to some implementations of the disclosed embodiments.

An exemplary implementation of the rear frame member 304 is depicted in FIG. 4 according to some embodiments. As can be seen, the rear frame member 304 defines a window or opening 304a through which arc blast may enter to compel the vent seal cover 312 closed. The window or opening 304a may have a height "C" of approximately 8.12 inches in some embodiments, leaving a roughly one and a quarter inch border 332 around the window 304a. The overall height "D" of the rear frame member 304 may be about 10.62 inches and the overall width "E" of the rear frame member 304 may be about 20.20 inches in some embodiments. Cutouts 334 may be formed in the border 332 on the upper portion near the middle thereof and on the lower portion near the middle thereof for mounting the catch mechanisms 322.

In the example shown here, the support braces 306 near the corners of the rear frame member 304 are part of a pair of opposing side support walls 336a and 336b extending perpendicularly from the sides of the rear frame member 304. Like the rear frame member 304, the side support walls 336a and 336b resemble a picture frame or window frame insofar as each side support wall 336a and 336b define a side slot 308a and 308b, respectively, therein. And while no top support wall is present in the present embodiments, a bottom support wall 338 may be provided in some embodiments extending perpendicularly from the bottom of the rear frame member 304 to provide additional support for the casing 300. Such a bottom support wall 338 may or may not have a bottom slot (not expressly shown) formed therein.

Figure 5:
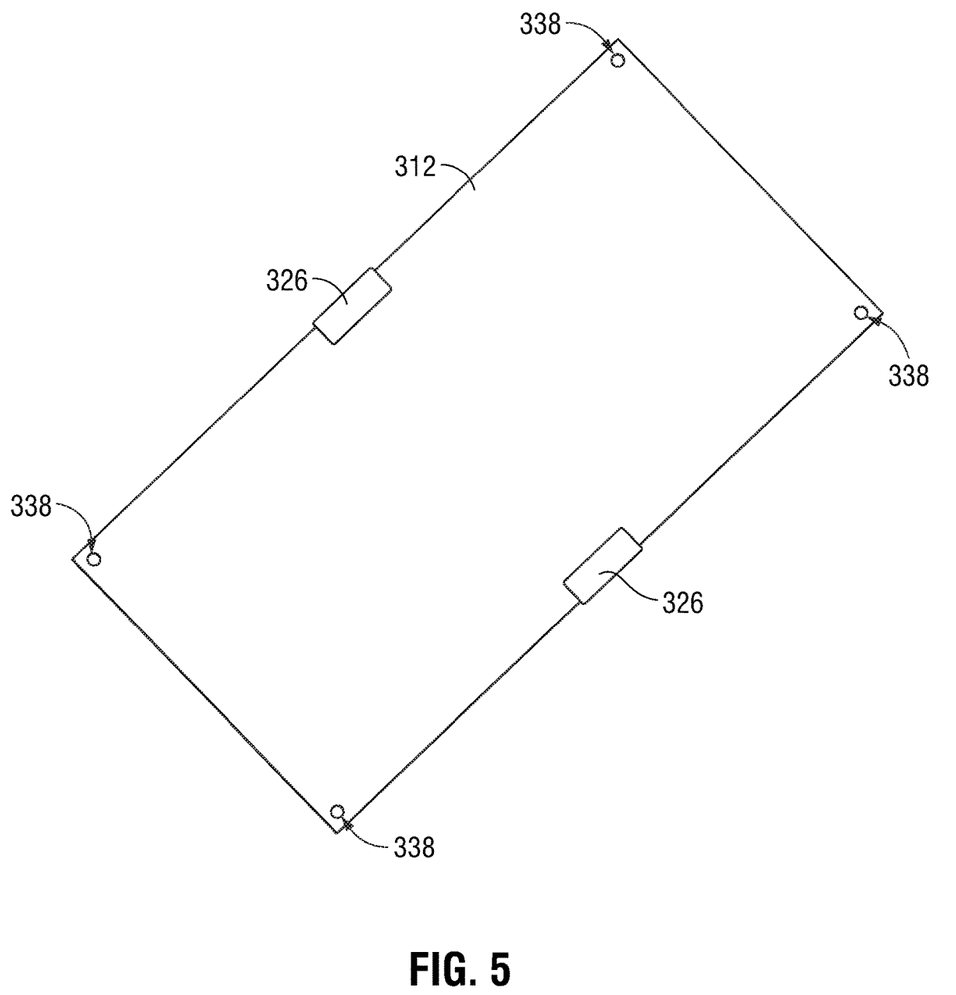
FIG. 5 is a perspective view of a vent seal cover of a vent seal assembly according to some implementations of the disclosed embodiments.

FIG. 5 illustrates an example of the vent seal cover 312 according to some embodiments. As mentioned earlier, the vent seal cover 312 may be a generally rectangular sheet of thin fiberglass material, such as GPO-3 fiberglass material. Where magnet-based catches 324 are used, metallic plates 326 may be attached or otherwise fastened to the vent seal cover 312 on the upper portion near the middle thereof and on the lower portion near the middle thereof to engage the magnet-based catches 324. Likewise, where roll pins 314 are used, holes 338 may be formed near the corners of the vent seal cover 312 for mounting the vent seal cover 312 on the roll pins 314. The holes 338 should be sufficiently large to allow the vent seal cover 312 to slide smoothly along the roll pins 314 with few or no hitches. To this end, in some embodiments, the roll pins 314 may be lubricated and/or the holes 338 may have ball bearings disposed therein to facilitate smooth sliding of the vent seal cover 312.

Figure 6:
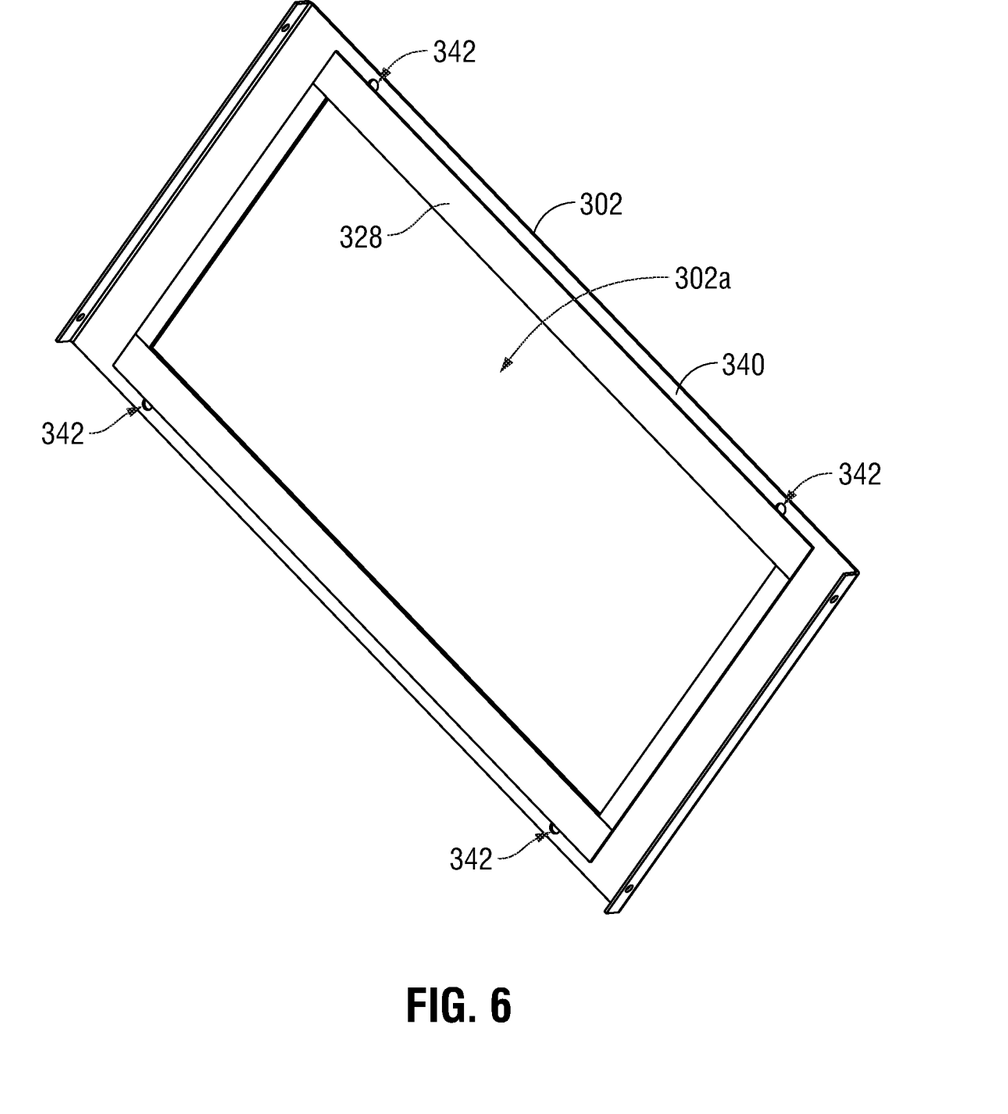
FIG. 6 is a perspective view of a front frame member of a vent seal assembly according to some implementations of the disclosed embodiments.

FIG. 6 illustrates an exemplary implementation of the front frame member 302 according to some embodiments. In this example, the front frame member 302 defines a window or opening 302a therein that is about the same size as the window or opening 304a in the rear frame member 304, leaving a border 340 around the window 302a that is about the same size as the border 332 (see FIG. 4) in the rear frame member 304. As well, the overall height and width of the front frame member 302 may be about the same as the overall height and width of the rear frame member 304 in some embodiments. The generally rectangular gasket or liner 328 mentioned earlier for facilitating an airtight seal may be disposed on the front frame member 302 along the border 340 around the window or opening 302a. Holes 342 may be provided near the corners of the front frame member 302 to allow the front frame member 302 to be screwed or otherwise fastened to the switchgear cabinet 102a-c via the screws 330 (see FIG. 3).

While particular aspects, implementations, and applications of the present disclosure have been illustrated and described, various alternatives exist that fall within the scope of the disclosed embodiments. Accordingly, it is to be understood that the present disclosure is not limited to the precise construction and compositions disclosed herein and that various modifications, changes, and variations may be apparent from the foregoing descriptions without departing from the embodiments as defined in the appended claims.

What is claimed is:

1. A vent seal assembly, comprising:
   a generally rectangular casing composed of a generally flat front frame member spaced apart by a predefined distance from a generally flat rear frame member, each frame member defining a generally rectangular window therein;
   linear guides extending between the front frame member and the rear frame member substantially perpendicular thereto, each linear guide positioned near a corner of the front frame member and the rear frame member;
   a generally rectangular vent seal cover slidably mounted on the linear guides between the front frame member and the rear frame member substantially parallel thereto; and
   a catch mechanism mounted on the rear frame member and configured to releasably hold the vent seal cover against the rear frame member to allow air flow through the window in the front frame member.

2. The vent seal assembly of claim 1, further comprising support braces extending between the front frame member and the rear frame member substantially perpendicular thereto, the support braces keeping the front frame member spaced apart by the predefined distance from the rear frame member.

3. The vent seal assembly of claim 1, wherein the catch mechanism is a magnet-based catch.

4. The vent seal assembly of claim 3, wherein two magnet-based catches are mounted on the rear frame member, one magnet-based catch on an upper portion of the rear frame member near a middle thereof and one magnet-based catch on a lower portion of the rear frame member near a middle thereof.

5. The vent seal assembly of claim 4, further comprising metallic plates mounted on the vent seal cover at locations corresponding to the magnet-based catches mounted on the rear frame member.

6. The vent seal assembly of claim 1, wherein the linear guides are pins and the vent seal cover is suspended from the pins.

7. The vent seal assembly of claim 1, further comprising a generally rectangular gasket disposed on the front frame member around the window in the front frame member on a side facing the vent seal cover.

* * * * *